(12) United States Patent
Roisman

(10) Patent No.: US 11,106,874 B2
(45) Date of Patent: Aug. 31, 2021

(54) AUTOMATED CHATBOT LINGUISTIC EXPRESSION GENERATION

(71) Applicant: SAP SE, Walldorf (DE)

(72) Inventor: Pablo Roisman, Hod Hasharon (IL)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 16/407,119

(22) Filed: May 8, 2019

(65) Prior Publication Data

US 2020/0356632 A1    Nov. 12, 2020

(51) Int. Cl.
| | |
|---|---|
| *G06F 40/30* | (2020.01) |
| *G06N 20/00* | (2019.01) |
| *G06F 40/211* | (2020.01) |
| *H04L 12/58* | (2006.01) |

(52) U.S. Cl.
CPC ........... *G06F 40/30* (2020.01); *G06F 40/211* (2020.01); *G06N 20/00* (2019.01); *H04L 51/02* (2013.01)

(58) Field of Classification Search
CPC ............ G06F 16/90332; G06F 40/211; G06F 40/216; G06F 40/30; G06F 40/56; G06F 40/00–58; G06F 16/3344; G06F 16/3329; G06N 20/00; H04L 51/02; G06K 9/6256
USPC ............................ 704/1, 9, 10, 257, 270–275
See application file for complete search history.

(56) References Cited

U.S. PATENT DOCUMENTS

| | | | |
|---|---|---|---|
| 8,244,749 B1 * | 8/2012 | Das ................... | G06F 16/90324 |
| | | | 707/765 |
| 8,612,532 B2 * | 12/2013 | Bangalore .............. | G06Q 10/06 |
| | | | 709/206 |
| 10,839,154 B2 * | 11/2020 | Galitsky .................. | G06N 5/02 |
| 2020/0242964 A1 * | 7/2020 | Wu .......................... | G09B 7/02 |
| 2020/0257857 A1 * | 8/2020 | Peper ..................... | G06F 40/30 |
| 2020/0327196 A1 * | 10/2020 | Sampat ................... | G06F 40/30 |

FOREIGN PATENT DOCUMENTS

KR           101851785          6/2018

OTHER PUBLICATIONS

Sun Y, Tang D, Duan N, Qin T, Liu S, Yan Z, Zhou M, Lv Y, Yin W, Feng X, Qin B. Joint learning of question answering and question generation. IEEE Transactions on Knowledge and Data Engineering. Feb. 6, 2019;32(5):971-82. (Year: 2019).*

Uma M, Sneha V, Sneha G, Bhuvana J, Bharathi B. Formation of SQL from natural language query using NLP. In2019 International Conference on Computational Intelligence in Data Science (ICCIDS) Feb. 2, 20191 (pp. 1-5). IEEE. (Year: 2019).*

(Continued)

*Primary Examiner* — Jesse S Pullias
(74) *Attorney, Agent, or Firm* — Klarquist Sparkman, LLP

(57) ABSTRACT

Linguistic expressions for training a chatbot can be generated in an automated system via linguistic expression templates that are associated with intents. The pre-categorized linguistic expressions can then be used for training and validation. Chatbot development can thus be improved by having a large number of expressions for development, leading to a more robust chatbot. In practice, the process can iterate with modifications to the templates until a suitable benchmark is met. The technique can be applied across human languages to generate chatbots conversant in any number of languages and is applicable to a variety of domains.

19 Claims, 11 Drawing Sheets

(56) References Cited

OTHER PUBLICATIONS

T. Weerasooriya, N. Perera and S. R. Liyanage, "A method to extract essential keywords from a tweet using NLP tools," 2016 Sixteenth International Conference on Advances in ICT for Emerging Regions (ICTer), Negombo, 2016, pp. 29-34, doi: 10.1109/ICTER.2016.7829895. (Year: 2016).*

"Levenshtein Distance," *Wikipedia*, www.wikipedia.org, visited Mar. 11, 2019, 8 pages.

Withey, Where to get Chatbot Training Data (and what it is), blog.ubisend.com, Jul. 18, 2017, 6 pages.

Palmerlee (MattsterP), "Building an AI Chatbot using a Regular Expression Engine," www.codeproject.com, Jun. 2007, 15 pages.

Jose, "Create your ELIZA Chatbot in 20 minutes with Regular Expressions (Day 6)," botartizan.com, visited Apr. 9, 2019, 9 pages.

Landgreen, "Chatbot Template (regular expressions) ['Build a Chatbot']," codepen.io, visited Apr. 9, 2019, 2 pages.

Pinard, "How to Boost Your Chatbot Performance Through Data," blogs.sap.com, Feb. 11, 2019, 1 page.

Desot Thierry et al., "Towards a French Smart-Home Voice Command Corpus: Design and NLU Experiments," Sep. 8, 2018, $12^{th}$ European Conference on Computer Vision, ECCV 2012 [Lecture Notes in Computer Science], Springer Berlin Heidelberg, pp. 509-517.

Mishakova Anastasiia et al., "Learning Natural Language Understanding Systems from Unaligned Labels for Voice Command in Smart Homes," 2019 IEEE International Conference on Pervasive Computing and Communications Workshops, IEEE, Mar. 11, 2019, pp. 832-837.

John Wieting et al., "Learning Paraphrastic Sentence Embeddings from Back-Translated Bittext," arxiv.org, Cornell University Library, 201 Olin Library Cornell University, Ithaca, NY, 14853, Jun. 6, 2017, 12 pages.

Chao Wang et al., "Automatic induction of language model data for a spoken dialogue system," Computers and the Humanities, Kluwer Academic Publishers, DO, vol. 40, No. 1, Nov. 8, 2006, pp. 25-46.

Chris Brockett et al., "Support Vector Machines for Paraphrase Identification and Corpus Construction," 2005, retrieved from the Internet: https://www.microsoft.com/en-us/resear/ch/wp-content/uploads/2016/02/I05-50015B15D.pdf, 8 pages.

Unit Chandra et al., "System for Semi-Automated Chatbots Query Classification Training Corpus Generation," Proceedings of the $24^{th}$ International Conference on Computing and Communications (ADCOM 2018), Sep. 22, 2018, retrieved from the Internet: https://accsindia.org/downloads/ADCOM-2018-papers/ADCOM_2018_paper_18.pdf, 4 pages.

Elena Manishina et al., "Automatic Corpus Extension for Data-Driven Natural Language Generation," Proceedings of the Tenth International Conference on Language Resources and Evaluation (LREC'16), May 2016, pp. 3624-3631, retrieved from the Internet: https://www.aclweb.org/anthology/L16-1757.pdf.

European Search Report received in counterpart European Patent Application No. EP 1926455.8, dated May 18, 2020, 10 pages.

* cited by examiner

AUTOMATED CHATBOT LINGUISTIC EXPRESSION GENERATION

FIELD

The field generally relates to machine learning in a chatbot development context.

BACKGROUND

Chatbots have become an increasingly prevalent phenomenon in the online world. A typical chatbot incorporates artificial intelligence, natural language processing, and some way to interact with users. Chatbots can be amazingly effective because they tend to interact with human users in the same way a human does (e.g., by voice, text, or the like). Thus, contemporary chatbots can be quite helpful in providing information, solving problems, executing simple tasks, and the like.

However, developing a chatbot can be quite challenging. In practice, the chatbot can be developed by providing training data to an untrained chatbot model. However, finding good training data can be a hurdle to chatbot development. Further, chatbot technology is not limited to a single human language such as English, so the hurdle is multiplied even further when trying to support multiple languages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method of automated linguistic expression generation comprises, based on a plurality of stored linguistic expression generation templates following a syntax, generating a plurality of generated linguistic expressions for developing a chatbot, wherein the generated linguistic expressions have respective pre-categorized intents; training the chatbot with selected training linguistic expressions of the generated linguistic expressions; and performing a validation on the trained chatbot with selected validation linguistic expressions of the generated linguistic expressions, wherein the validation generates a benchmark value indicative of performance of the chatbot.

In another embodiment, a computing system comprises one or more processors; memory storing a plurality of stored linguistic expression generation templates, wherein the templates are associated with respective intents; wherein the memory is configured to cause the one or more processors to perform operations comprising based on a plurality of stored linguistic expression generation templates following a syntax, generating a plurality of generated linguistic expressions for developing a chatbot, wherein the generated linguistic expressions have respective pre-categorized intents; and training the chatbot with selected training linguistic expressions of the training linguistic expressions and respective of the pre-categorized intents.

In another embodiment, one or more non-transitory computer-readable media comprising computer-executable instructions that, when executed, cause a computing system to perform a method comprising. from a plurality of stored linguistic expression generation templates following a syntax supporting optional multiple alternative phrases and grouped by intent, generating a plurality of generated linguistic expressions for developing a chatbot, wherein the generated linguistic expressions have respective pre-categorized intents according to an intent group of a given linguistic expression generation template from which the generated linguistic expressions were generated; augmenting the generated linguistic expressions via machine translation; filtering the generated linguistic expressions based on an edit distance; selecting a first subset of the generated linguistic expressions for use in training; selecting a second subset of the generated linguistic expressions for use in validation; training the chatbot with the generated linguistic expressions selected for use in training; and performing a validation on the trained chatbot with the generated linguistic expressions selected for use in validation, wherein the validation generates one or more benchmark values indicative of performance of the chatbot.

The foregoing and other objects, features, and advantages will become more apparent from the following detailed description, which proceeds with reference to the accompanying figures.

DETAILED DESCRIPTION

Example 1—Overview

Traditional chatbot (or simply "bot") training techniques suffer from an inability to find a sufficient number of linguistic expressions for training. For example, the number of actual conversations in chats or emails can be limited and may be difficult to find from amongst a sea of possibilities.

The problem is compounded in multi-lingual environments, such as for multi-national entities that strive to support a large number of human languages via chatbots.

Further, due to the limited number of available expressions, developers may shortchange or completely skip a validation of the chatbot. The resulting quality of the deployed chatbot can thus suffer accordingly.

As described herein, automated chatbot linguistic expression generation can be utilized to generate a large number of pre-categorized linguistic expressions. For example, a rich set of linguistic expressions with respective intents can easily be generated for a variety of chatbots in a variety of languages as described herein.

Due to the large number of available expressions that can be generated using the technologies described herein, validation can easily be performed. As described herein, any number of validation benchmarks can be performed.

If desired, the development process can iterate, with iterations converging on an acceptable benchmark. Fine tuning during the development cycle can be supported.

Other techniques such as expression augmentation, expression filtering, and the like can be used as described herein.

The described technologies thus offer considerable improvements over conventional chatbot development techniques.

Figure 1:
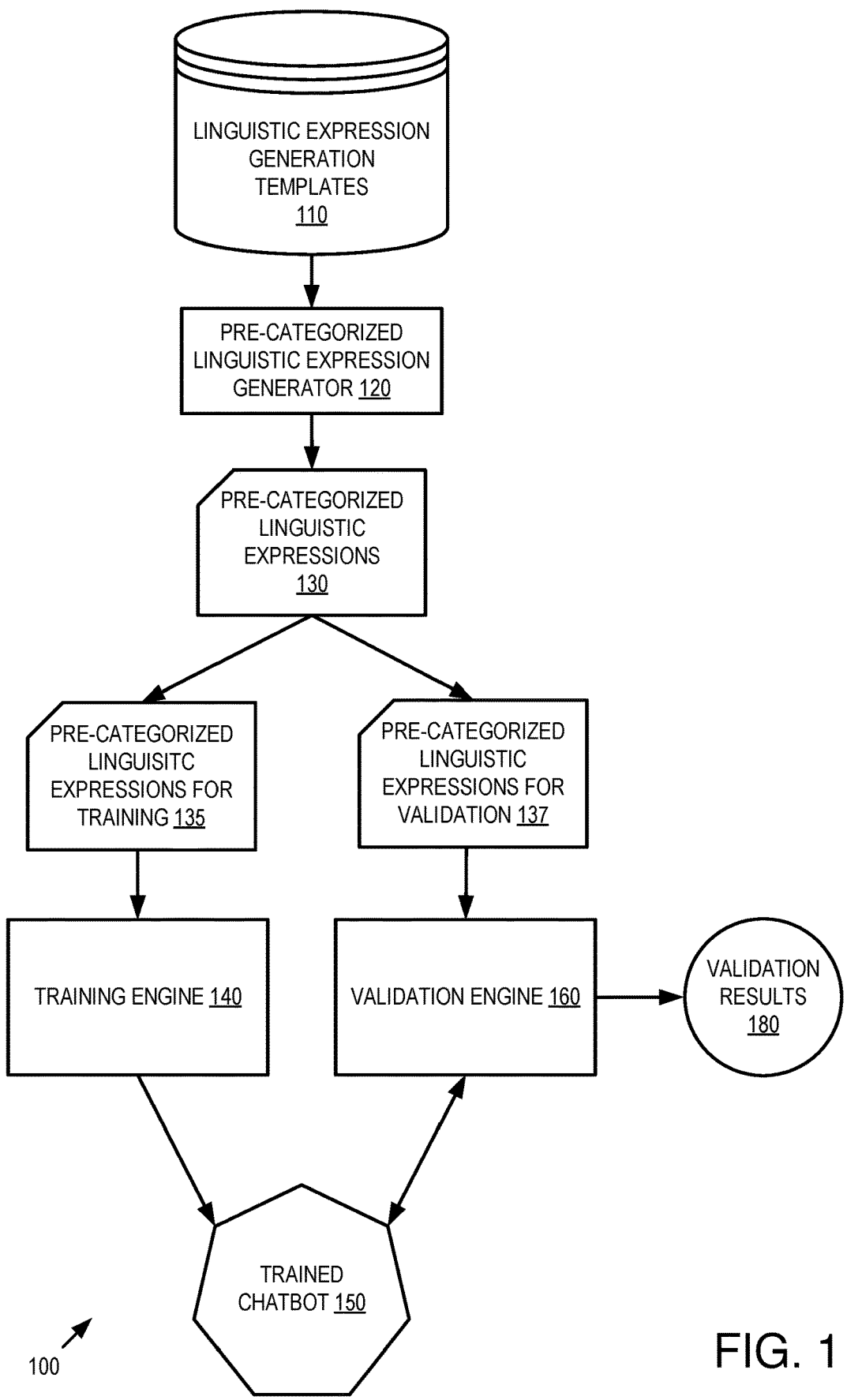
FIG. 1 is a block diagram of an example system implementing automated chatbot linguistic expression generation.

Example 2—Example System Implementing Automated Chatbot Linguistic Expression Generation FIG. 1 is a block diagram of an example system 100 implementing automated chatbot linguistic expression generation. In the example, the system 100 can include a pre-categorized linguistic expression generator 120 that accepts linguistic expression generation templates 110 and generates pre-categorized linguistic expressions 130. The expressions 130 can be pre-categorized in that an associated intent is already known for respective of the expressions 130.

A subset of the linguistic expressions 135 are selected for training; others 137 are selected for validation.

The expressions for training 135 are input to a training engine 140, which outputs a trained chatbot 150.

The validation engine 160 accepts the trained chatbot 150 and the expressions for validation 137 and outputs validation results 180 (e.g., a benchmark value as described herein).

As described herein, the system can iterate the training over time to converge on an acceptable benchmark value.

In practice, the systems shown herein, such as system 100, can vary in complexity, with additional functionality, more complex components, and the like. For example, there can be additional functionality within the validation engine 160. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the templates, expressions, chatbot, validation results, and the like can be stored in one or more computer-readable storage media or computer-readable storage devices. The technologies described herein can be generic to the specifics of operating systems or hardware and can be applied in any variety of environments to take advantage of the described features.

Figure 2:
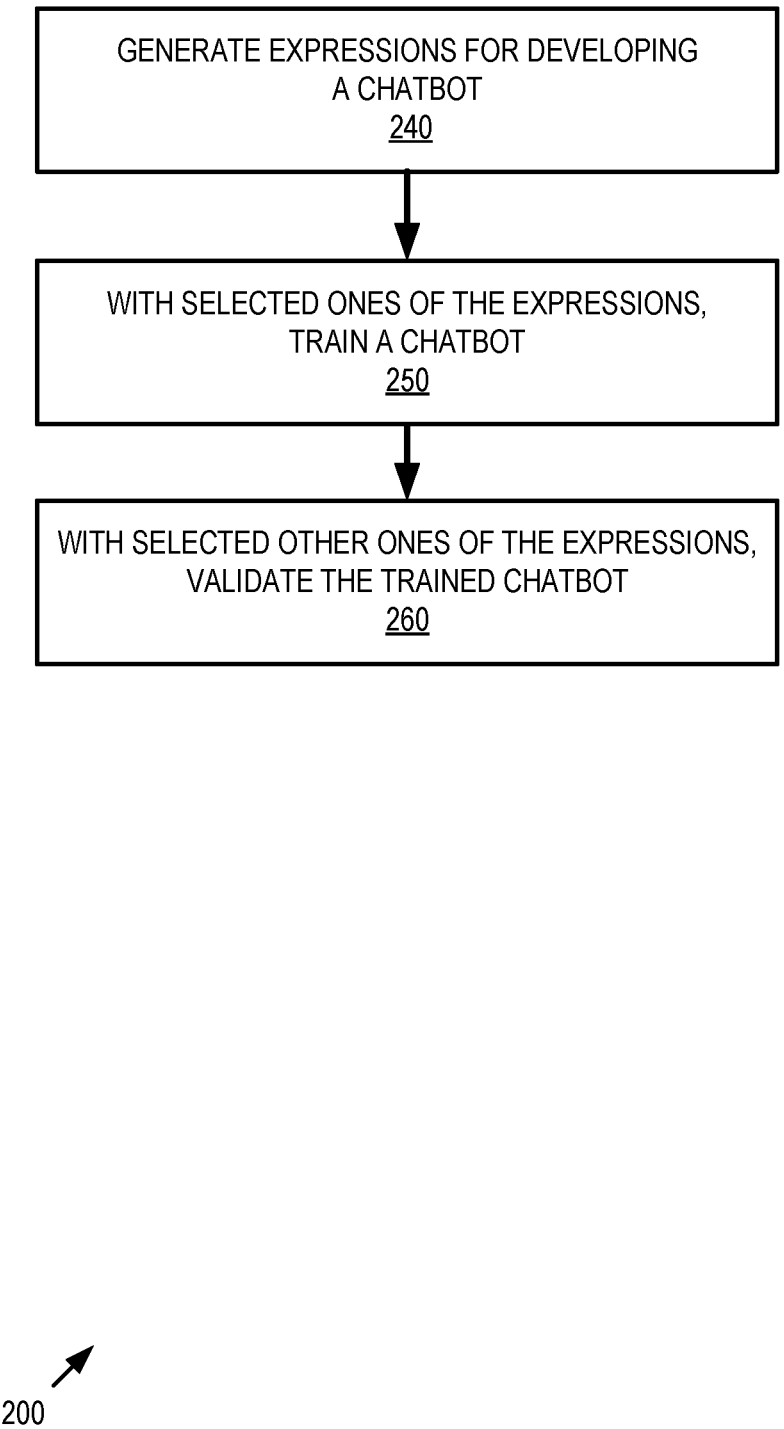
FIG. 2 is a flowchart of an example method of automated chatbot linguistic expression generation.

Example 3—Example Method Implementing Automated Chatbot Linguistic Expression Generation FIG. 2 is a flowchart of an example method 200 of automated chatbot linguistic expression generation and can be performed, for example, by the system of FIG. 1. The automated nature of the method 200 allows rapid production of a large number of linguistic expressions for developing a chatbot as described herein. Separately, the generation can be repeatedly employed for various purposes, such as re-training the chatbot, training a chatbot in different human languages, and the like.

In the example, at 240, based on a plurality of stored linguistic expression generation templates following a syntax, the method generates a plurality of generated linguistic expressions for developing a chatbot. The generated linguistic expressions can have respective pre-categorized intents. For example, some of the linguistic expressions can be associated with a first intent, and some, other of the linguistic expressions can be associated with a second intent, and so on. Association between the expressions and the intents can take different forms in the templates and can take different forms in the expressions themselves as described herein At 250, the method trains a chatbot with selected training linguistic expressions of the generated linguistic expressions. In practice, a number of the generated linguistic expressions can be selected for training. The remaining (e.g., other) ones can be used for validation. For example, a number of linguistic expressions can be selected randomly for training. In practice, the number of training expressions is typically lower than the number of validation expressions.

At 260, the method performs a validation on the trained chatbot with selected validation linguistic expressions of the generated linguistic expression. The validation can generate a benchmark value indicative of performance of the chatbot (e.g., a benchmark quantification).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies.

Example 4—Example Iteration

In any of the examples herein, the training process can be iterated to improve the quality of the generated chatbot. For example, the training and validation can be repeated over multiple iterations as the templates are modified (e.g., attempted to be improved) and the benchmark converges on an acceptable value.

The training and validation can be iterated (e.g., repeated) until an acceptable benchmark value is met. Such an approach allows modifications to the templates until a suitable set of templates results in an acceptable chatbot.

Example 5—Example Pre-Categorization

In any of the examples herein, the generated linguistic expressions generated can be pre-categorized. They are pre-categorized in that the respective intent for the expression is already known. Such intent can be associated with the linguistic expression generation template from which the expression is generated.

Such an arrangement can be beneficial for training because the respective intent is already known and can be used as input to the training engine. Similarly, the arrangement is beneficial for validation because the intent can be used as input to the validation engine to determine whether the chatbot chooses the correct intent.

In practice, the intent can be used at runtime of the chatbot to determine what task to perform. If the trained chatbot can successfully recognize the correct intent for a given linguistic expression, it is considered to be properly processing the given linguistic expression.

Example 6—Example Templates

In any of the examples herein, linguistic expression generation templates (or simply "templates") can be used to generate linguistic expressions for developing a chatbot. As described herein, such templates can be stored in one or more non-transitory computer-readable media and used as input to an expression generator that outputs linguistic expressions for use with the chatbot training and/or validation technologies described herein.

Figure 3:
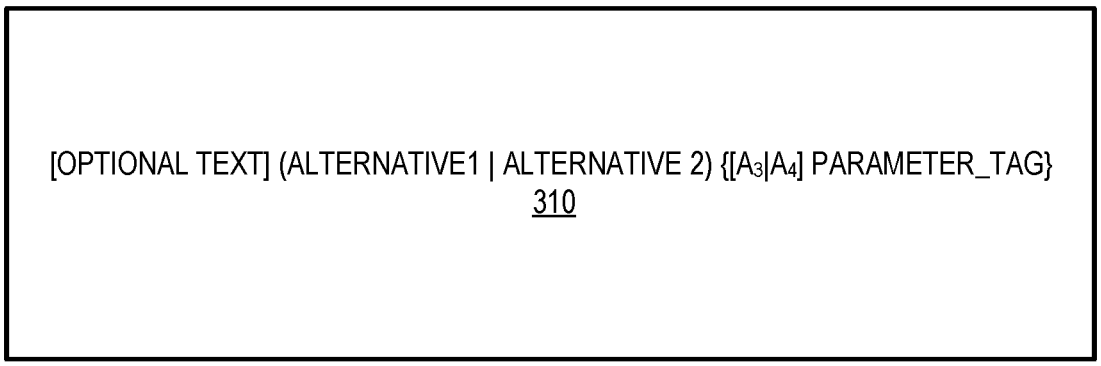
FIG. 3 is a block diagram showing example linguistic expression template syntax, an example actual template, and example linguistic expressions generated therefrom.
Figure 3:
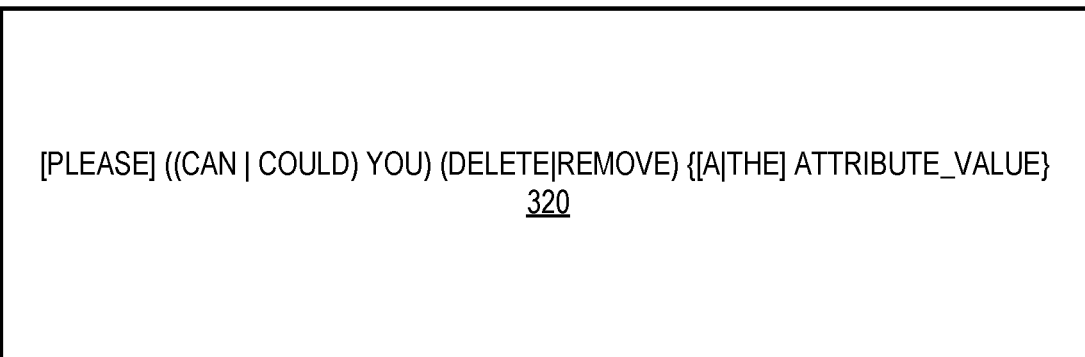
Figure 3:
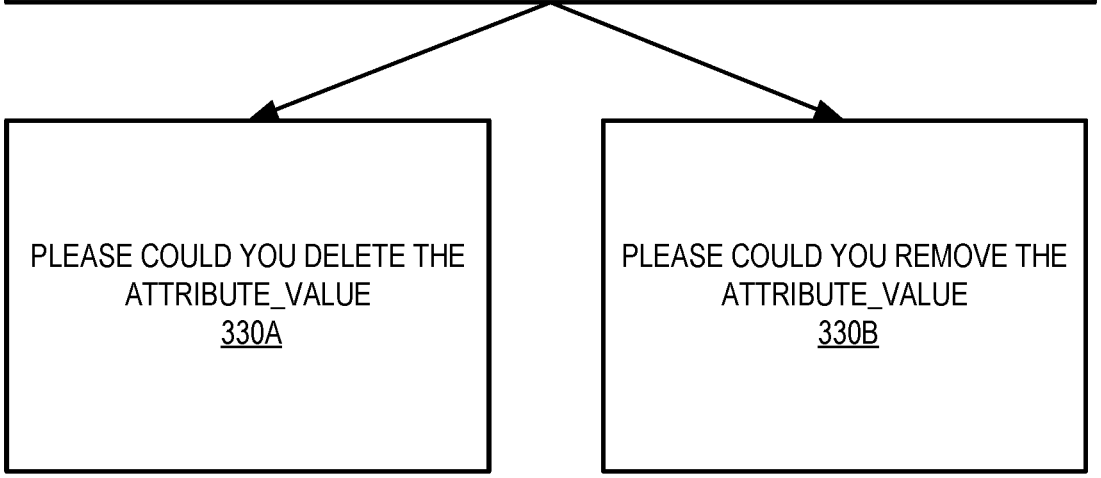

FIG. 3 is a block diagram showing example linguistic expression template syntax 310, an example actual template 320, and example linguistic expressions 330A-B generated therefrom.

In the example, the template syntax 310 supports multiple alternative phrases (e.g., in the syntax a plurality of alternative phrases can be specified, and the expression generator will pick one of them). The example shown uses a vertical bar "I" as a separator between parentheses, but other conventions can be used. In practice, the syntax is implemented as a grammar specification from which linguistic expressions can be generated.

In practice, the generator can choose from among the alternatives in a variety of ways. For example, the generator can generate an expression using each of the alternatives (e.g., all possible combinations for the expression). Other techniques can be to choose an expression at random, weighted choosing, and the like. The example template 320 incorporates at least one instance of multiple alternative phrases. In practice, there can be any number of multiple alternative phrases, leading to an explosion in the number of expressions that can be generated therefrom. For sake of example, two possibilities 330A and 330B are shown (e.g., "delete" versus "remove"); however, in practice, due to the number of other multiple alternative phrases, many more expressions can be generated.

In the example, the template syntax 310 supports optional phrases. Optional phrases specify that a term can be (but need not be) included in generated expressions.

In practice, the generator can choose whether to include optional phrases in a variety of ways. For example, the generator can generate an expression with the optional phrase and generate another expression without the optional phrase. Other techniques can be to randomly choose whether to include the expression, weighted inclusion, and the like. The example template 320 incorporates an optional phrase. In practice, there can be any number of optional phrases, leading to further increase in the number of expressions that can be generated from the underlying template. Multiple alternative phrases an also be incorporated into the optional phrase mechanism, resulting in optional multiple alternative phrases (e.g., none of the options need to be incorporated into the expression, or one of the options can be incorporated into the template).

Figure 4:
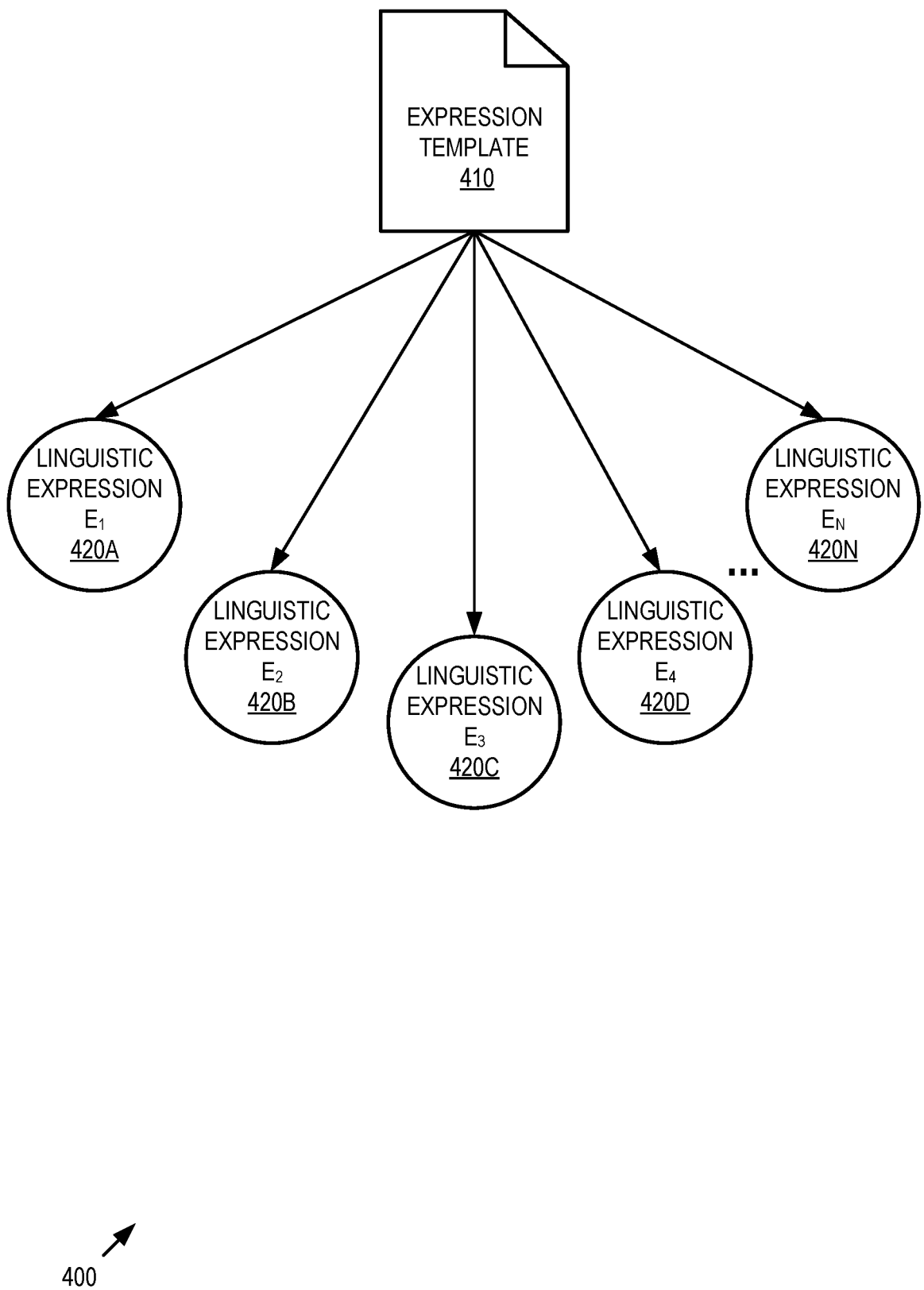
FIG. 4 is a block diagram showing numerous example linguistic expressions generated from an example linguistic expression template.

FIG. 4 is a block diagram showing numerous example linguistic expressions 420A-N generated from an example linguistic expression template 410. In one example, a set of 20 templates was used to generate about 60,000 different expressions.

If desired, the template text can be translated (e.g., by machine translation) to another human language to provide a set of templates for the other language, or serve as a starting point for a set of finalized templates for the other language. The syntax elements (e.g., delimiters, etc.) need not be translated and can be left untouched by a machine translation.

Example 7—Additional Syntax

The syntax (e.g., 310) can support regular expressions. Such regular expressions can be used to generate templates.

An example syntax can support optional elements, 0 or more iterations, 1 or more iterations, from x to y iterations of specified elements (e.g., strings).

The syntax can allow pass-through of metacharacters that can be interpreted by downstream processing. Further grouping characters (e.g., "{" and "}") can be used to form blocks that are understood by other template rules as follows:

({[please] create}|{add [new]}) BUSINESS_OBJECT.

Example notation can include the following, but other arrangements are equally possible:
Elements
[ ]: optional element
*: 0 or more iterations
+: 1 or more iterations
{x, y}: from x to y iterations Example 8—Additional Syntax: Dictionaries Dictionaries can also be supported as follows:
Dictionaries
ATTRIBUTE_NAME: supplier, price, name
ATTRIBUTE_VALUE: Avantel, green, notebook
BUSINESS_OBJECT: product, sales order Example 9—Additional Template Syntax Additional syntax can be supported as follows:
Elements
< >: any token (word)
[ ]: optional element
*: 0 or more iterations
+: 1 or more iterations
{x, y}: from x to y iterations
================
Dictionaries
ATTRIBUTE_NAME: supplier, price, name
ATTRIBUTE_VALUE: Avantel, green, notebook
BUSINESS_OBJECT: product
================

CORE entities
CURRENCY: $10, 999 euro
PERSON: John Smith, Mary Johnson
MEASURE: 1 mm, 5 inches
DATE: Oct. 10, 2018
DURATION: 5 weeks
======================

Parts of Speech and phrases
ADJECTIVE: small, green, old
NOUN: table, computer
PRONOUN: it, he, she
NOUN_GROUP: game of thrones Example 10—Example Intents In any of the examples herein, the system can support a wide variety of intents. The intents can vary based on the domain in which the chatbot operates and are not limited by the technologies described herein. For example, in a software development domain, the intents may include "delete," "create," "update," "check out," and the like. A generated expression has a pre-categorized intent, which can be sourced from the templates (e.g., the template used to generate the expression is associated with the intent).

From a chatbot perspective, the incoming linguistic expression can be mapped to an intent. For example, "submit new leave request" can map to "create." "show my leave requests" can map to "read."

In practice, any number of other intents can be used for other domains, and they are not limited in number or subject matter.

In practice, it is time consuming to provide sample linguistic expressions for the different intents because a developer must generate many samples for training and even more for validation. If validation is not successful, the process must be done again.

Example 11—Example Pre-Categorized Linguistic Expression Generation System

Figure 5:
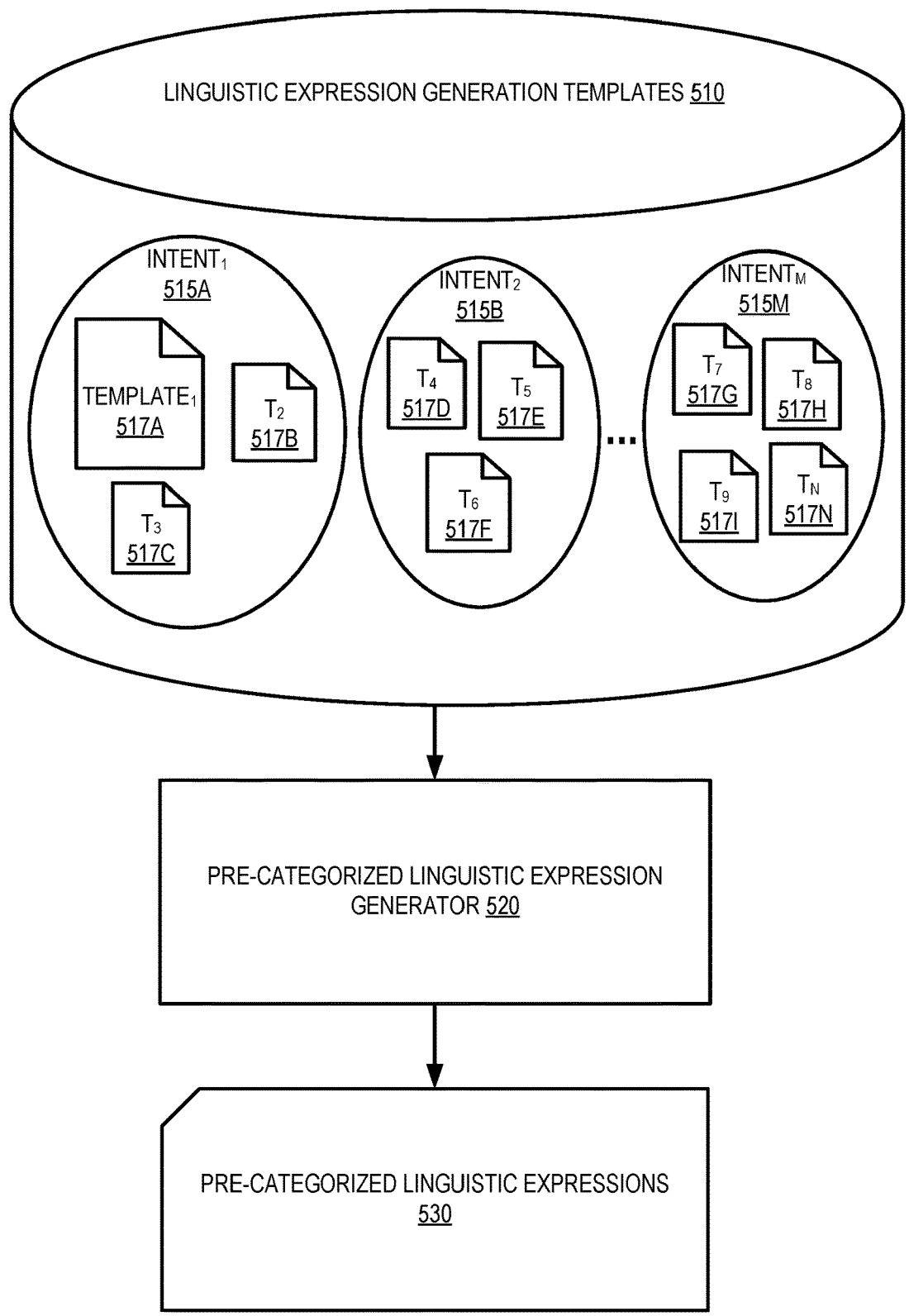
FIG. 5 is a block diagram of an example system employing a pre-categorized expression generator to generate pre-categorized linguistic expressions from linguistic expression generation templates associated with intents.

FIG. 5 is a block diagram of an example system 500 employing a pre-categorized expression generator 520 to generate pre-categorized linguistic expressions 530 from linguistic expression generation templates 517A-N associated with intents 515A-M. In practice, there can be more templates (e.g., per intent and overall) and more intents than those shown.

In the example, the templates 517A-N can be associated with intents 515A-M in a variety of ways. For example, they can be simply grouped together in a single file or folder, in which case location of the template indicates the intent. Or, the template can expressly indicate an intent (e.g., by name, intent identifier, or the like).

The pre-categorized linguistic expression generator 520 (e.g., generator 120 of FIG. 1) can generate the pre-categorized linguistic expressions 530 as described herein. Again the expressions 530 can be associated with intent (e.g., the same intents of the groups 515A-M) by location or by express indication.

The expressions are said to be "pre-categorized" in that an intent is already associated with the intent upon generation. The associated intent indicates the intent to which is should be mapped by the chatbot.

Example 12—Example Pre-Categorized Linguistic Expression Generation Method

Figure 6:
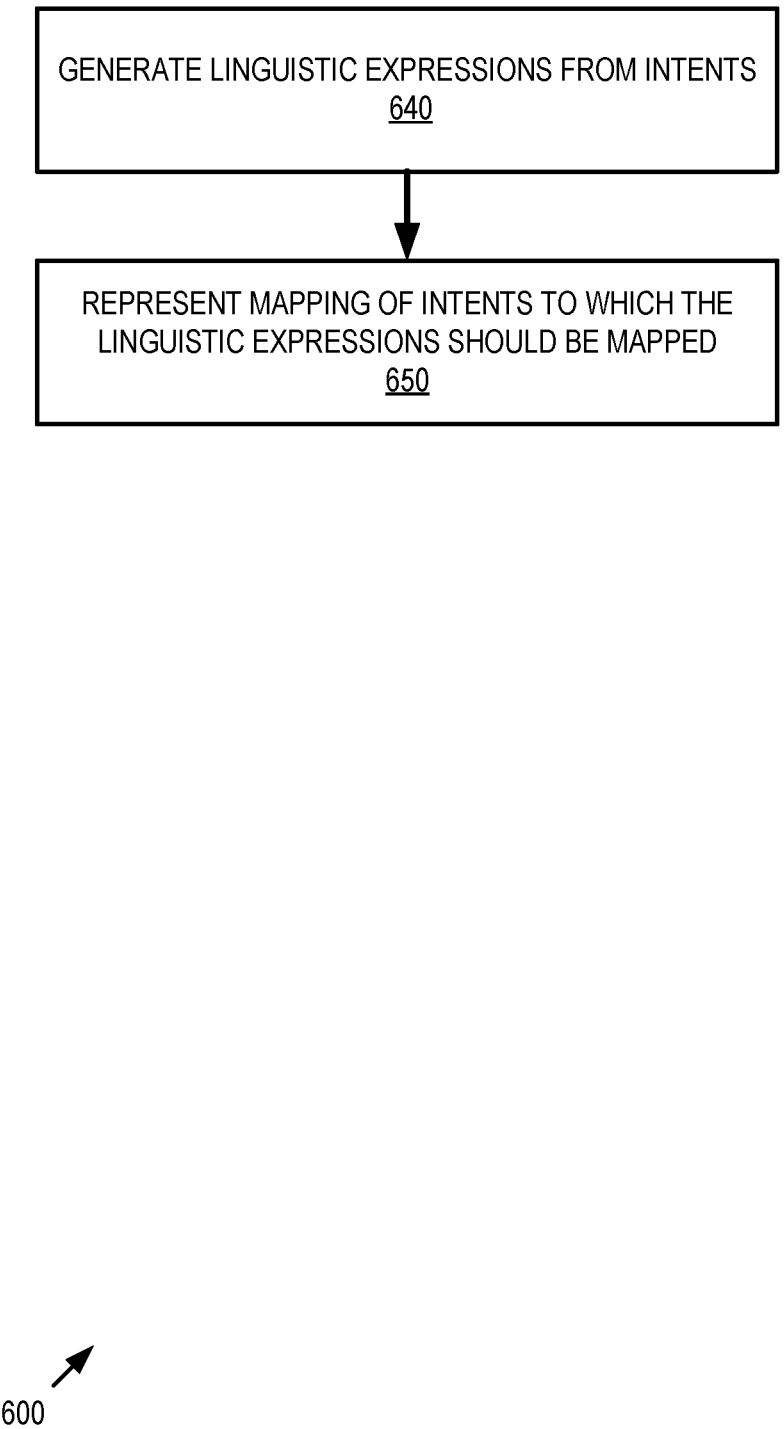
FIG. 6 is a flowchart of an example method of generating pre-categorized linguistic expressions from linguistic expression generation templates associated with intents.

FIG. 6 is a flowchart of an example method of generating pre-categorized linguistic expressions from linguistic expression generation templates associated with intents and can be performed, for example, by the system 500 of FIG. 5.

At 640, a linguistic expression is generated for an intent. The intent is already known at the time the expression is generated.

At 650, a mapping of intents to which the generated linguistic expressions should be mapped (e.g., by a correct chatbot) are represented. As described herein, such mapping can be represented by location or position (e.g., where the expression appears), expressly represented (e.g., by an intent name or intent identifier), or the like. For example, the expressions can be stored as intent, expression pairs. Where the intent is stored as a name or other identifier, and the expression is stored as text.

Example 13—Example Linguistic Expression Augmentation System

In any of the examples herein, the generated linguistic expressions can be augmented to further increase the number of expressions that can be used for training and/or validation.

Figure 7:
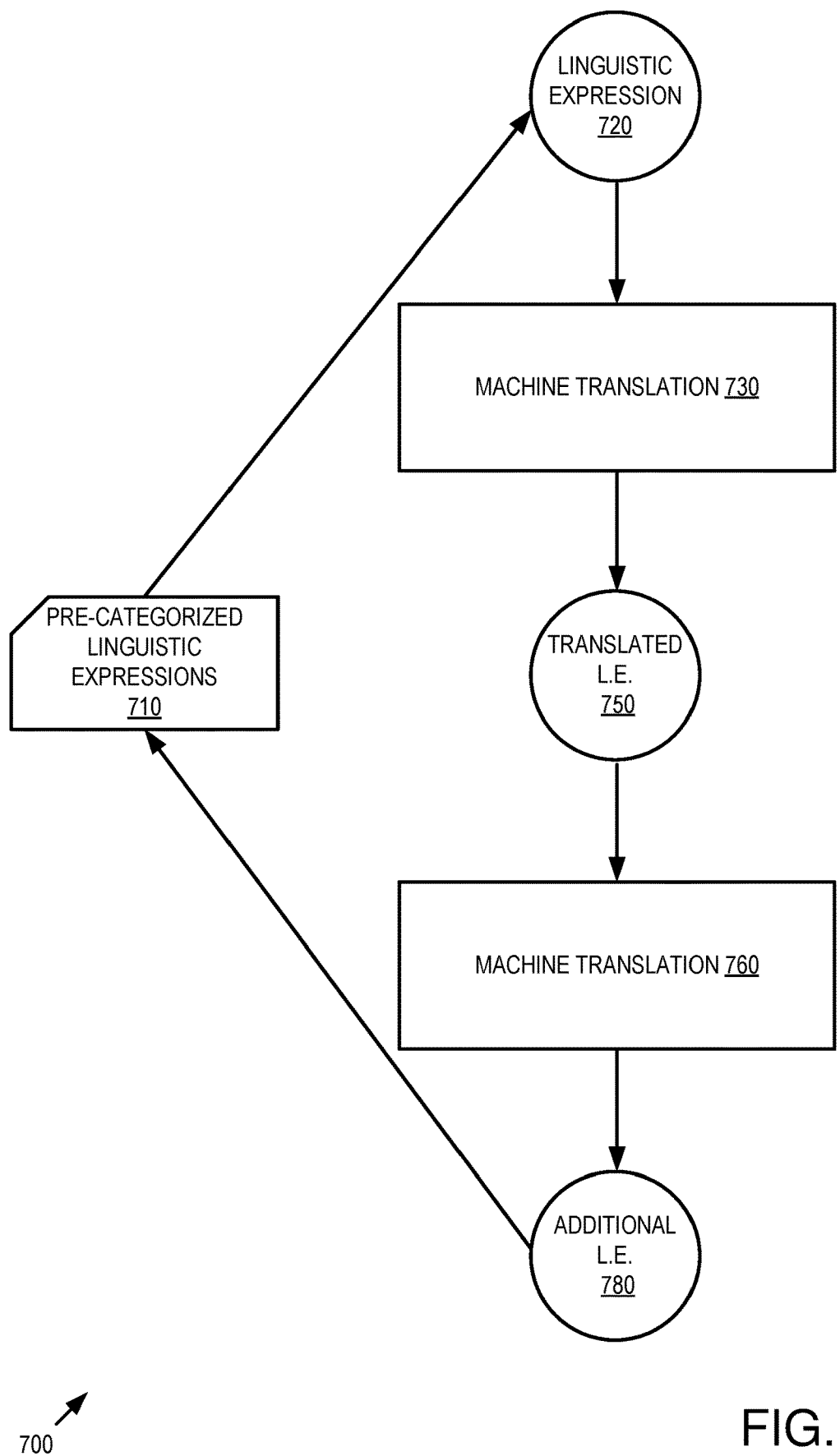
FIG. 7 is a block diagram of an example system augmenting linguistic expressions.

FIG. 7 is a block diagram of an example system 700 augmenting linguistic expressions. In the example, a linguistic expression 720 is drawn from the pre-categorized linguistic expressions 710 and used as input to a machine translation 730 (e.g., to a different human language, such as from English to Italian), which generates an output (translated) linguistic expression 750. The translated linguistic expression 750 is then used as input to another machine translation 760 to translate it back to the original language (e.g., from Italian to English), which generates an output (re-translated) linguistic expression 780 that serves as an additional linguistic expression that can be added to the generated ones 710

The intent of the additional linguistic expression 780 can be gleaned (e.g., be equal to) the intent of the input expression 720.

In practice, other intermediate translations can be included (e.g., from English to Italian to Russian, and back to English).

The technique can be applied to any number of the generated expressions to generate additional expressions.

Example 14—Example Linguistic Expression Augmentation Method

Figure 8:
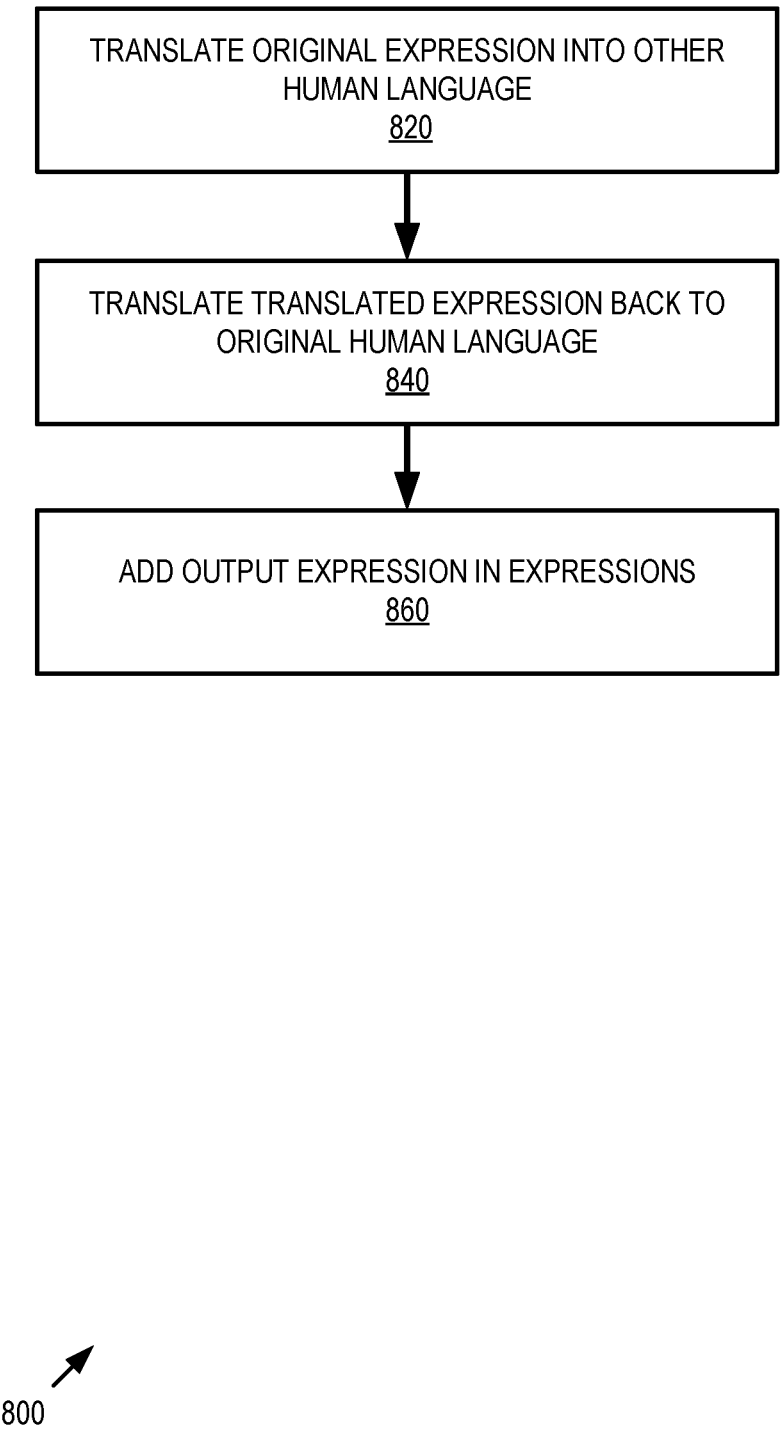
FIG. 8 is a flowchart of an example method of augmenting linguistic expressions.

FIG. 8 is a flowchart of an example method 800 of augmenting linguistic expressions and can be implemented, for example, by a system 700 such as that shown in FIG. 7.

At 820, the method translates an original (e.g., generated) linguistic expression from one human language to another by machine translation.

At 840, the translated expression is translated back to the original human language.

At 860, the output (the re-translated expression) is added to the expressions for use in training and/or validation. The original expressions are thus augmented and such augmented expressions can be used for training or validation in addition to those generated directly from templates.

As described above, one or more additional translations can be done for one or more other intermediate human languages.

Example 15—Example Linguistic Expression Selection

In any of the examples herein, selecting which expressions to use for which phases of the development can be varied. In one embodiment, a small amount (e.g., less than half, less than 25%, less than 10%, less than 5%, or the like) of available expressions are selected for the training set, and the remaining ones are used for validation. In another embodiment, overlap between the training set and the validation set is permitted (e.g., a small amount of available expressions are selected for the training set, and all of them or filtered ones are used for validation). Any number of other arrangements are possible based on the validation methodology and developer preference. Such selection can be configured by user interface (e.g., one or more sliders) if desired.

Example 16—Example Linguistic Expression Filtering

In any of the examples herein, it may be desirable to filter out some of the expressions. In some cases, such filtering can improve confidence in the developed chatbot.

For example, a linguistic distance calculation can be performed on the available linguistic expressions. Some expressions that are very close to (e.g., linguistically similar to) one or more others can be removed.

Such filtering can be configurable to remove a configurable number (e.g., absolute number, percentage, or the like) of expressions from the available expressions.

An example of such a linguistic difference calculation is the Levenshtein distance (e.g., edit distance), which is a string metric for indicating the difference between two sequences. Distance can be specified in number of tokens (e.g., characters, words, or the like).

For example, a configuring user may specify that 20,000 of the expressions that are very similar should be removed from use during training and/or validation.

Example 17—Example Fine Tuning

In any of the examples herein, the developer can fine tune development of the chatbot by specifying what percentage of generated expressions to use in the training set and the distance level (e.g., edit distance) of expressions.

For example, if the distance is configured to less than 3 tokens, then "please create the object" is considered to be the same as "please create an object," and only one of them will be used for training.

Example 18—Example Benchmark

In any of the examples herein a variety of benchmarks can be used to measure quality of the chatbot. Any one or more of them can be measured during validation.

For example, the number of correct intents can be quantified as a percentage or other rating. Other benchmarks can be response time, number of uncategorized expressions (e.g., failure or crashes), and the like.

In practice, one or more values are generated as part of the validation process, and the values can be compared against benchmark values to determine whether the chatbot is acceptable. As described herein, a chatbot that fails validation can be re-developed by modifying the templates.

Example one or more benchmark values that can be calculated during validation include accuracy, precision, recall, F1 score, or combinations thereof.

Accuracy can be a global grade on the performance of the chatbot. Accuracy is the proportion of successful classifications out of the total predictions conducted during the benchmark. While it is a good indication of performance for chatbots with balanced intents, it may be biased for unbalanced bots.

Precision can be a metric that is calculated per intent. For each intent, it measures the proportion of correct predictions out of all the times the intent was declared during the benchmark. It answers the question "Out of all the times the bot predicted this intent, how many times was it correct?" Low precision usually signifies the relevant intent needs cleaning, which means removing sentences that do not belong to this intent.

Recall can also be a metric calculated per intent. For each intent, it measures the proportion of correct predictions out of all the entries belonging to this intent. It answers the question "Out of all the times my bot was supposed to detect this intent, how many times did it do so?" Low recall usually signifies the relevant intent needs more training, for example, by adding more sentences to enrich the training.

F1 score can be the harmonic mean of the precision and the recall. It can be a good indication for the performance of each intent and can be calculated to range from 0 (bad performance) to 1 (good performance). The F1 scores for each intent can be averaged to create a global indication for the performance of the bot.

Other metrics for benchmark values are possible.

Validation can also continue after using the expressions described herein.

As described herein, the benchmark can be used to control when development iteration ceases. For example, the development process (e.g., training and validation) can continue to iterate until the benchmark meets a threshold level (e.g., a level that indicates acceptable performance of the chatbot).

Example 19—Example Chatbot

In any of the examples herein, a chatbot can be implemented via any number of chatbot architectures.

In practice, the chatbot can be structured as a basic chatbot engine and an underlying internal representation of its knowledge base that is developed based on training data. It is the knowledge base that is typically validated because the knowledge base can be altered by additional training or re-training.

The chatbot can accept user input in the form of text or speech (e.g., converted to text) that is then recognized by the chatbot (e.g., as indicating an intent). The chatbot can extract parameters from the user input to then act on it.

For example, a user may say or type "could you please cancel auto-renew," and the chatbot, responsive to recognition of the "cancel" intent, begin a cancelation workflow for auto-renew (e.g., asking for confirmation or other pertinent information).

Figure 9:
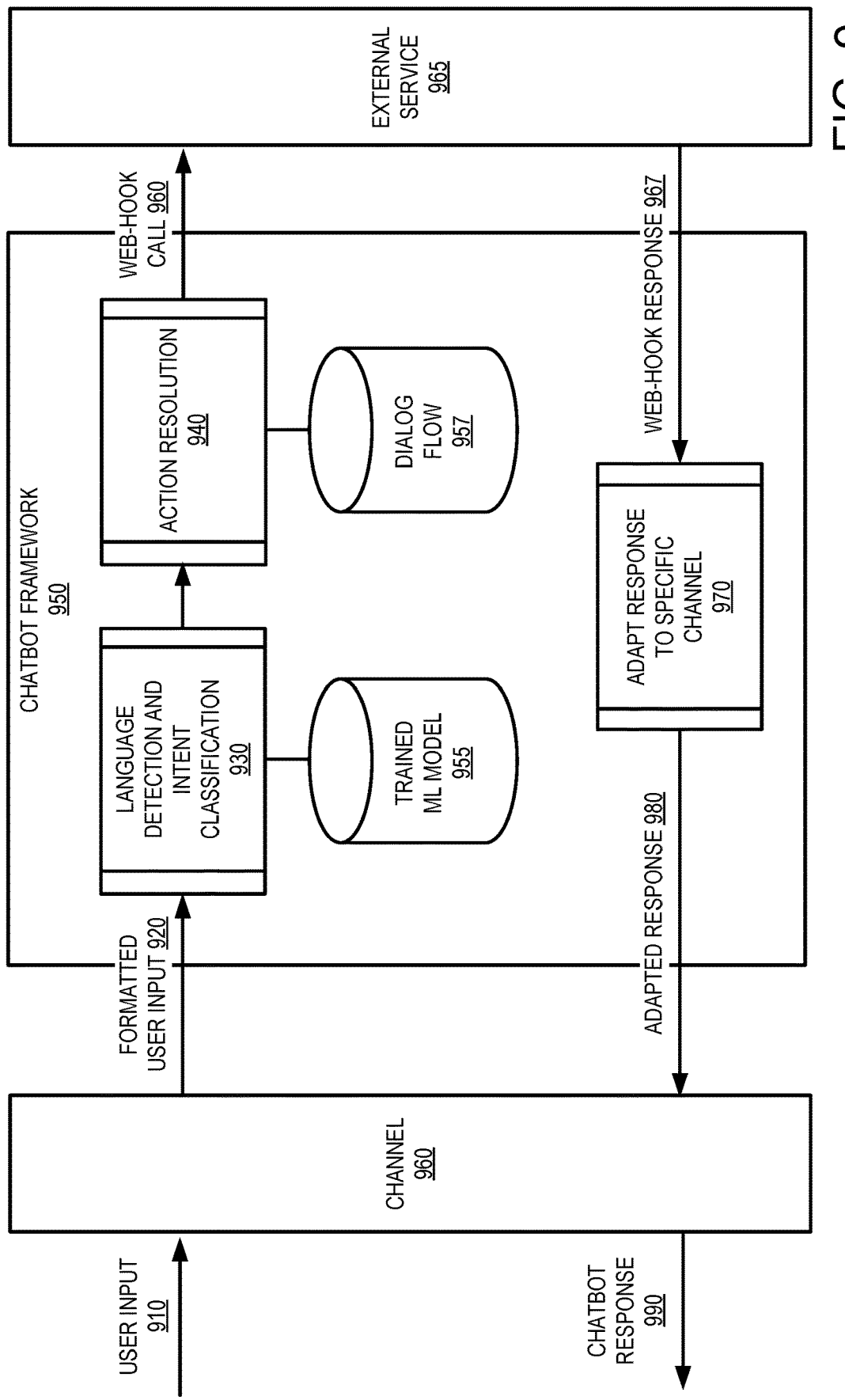
FIG. 9 is a block diagram of an example chatbot architecture.

FIG. 9 is a block diagram of an example chatbot architecture that can be used for any of the examples here. In the example, a chatbot environment 900 comprises a chatbot framework 950, a channel 960, and an external service 965.

An end user typically communicates with the chatbot by connecting through a chatbot channel 960 (e.g., a messaging application such as Facebook Messenger, Slack Chat, a custom webchat, or the like; a voice-activated appliance or computing system; or the like). After the end user sends input 910 (e.g., by speaking, typing, or the like), it is possibly reformatted and redirected to the chatbot framework 950. A natural language processing-based component 930 can detect the language, tokens, entities, and intent in the user input 920. The component 930 can use a trained machine learning model 955 based on the training dataset provided by the chatbot developer. The outcome of the natural language processing can be used for the action resolution process 940, which determines the next step of the process according to the dialog flow 957 defined by the chatbot developer at design time. The dialog flow can contain a confirmation step, slot filling of mandatory parameters, and the like. Then, based on the results, a webhook call 960 is sent to an external API 965 (e.g., to accomplish a task for the intent).

A response 967 of the external API is adapted to the specific bot channel by 970 and sent back 980 to the end user and delivered as a chatbot response 990.

In practice, any number of other variants is possible. For example, the external service 965 can be integrated into the chatbot framework 950.

Example 20—Example Pre-Categorized Linguistic Expression Generator

In any of the examples described herein, a pre-categorized linguistic expression generator can be used to generate expressions for use in training and validation of a chatbot.

In practice, the generator iterates over the input templates. For each template, it reads the template and generates a plurality of output expressions based on the template syntax. The output expressions are then stored for later consideration at the training or validation phase.

Example 21—Example Training Engine

In any of the examples herein, a training engine can train a chatbot.

In practice, the training engine iterates over the input expressions. For each expression, it applies the expression and the associated intent to a training technique that modifies the chatbot. When it is finished, the trained chatbot is output for validation. In practice, an internal representation of the trained chatbot (e.g., its knowledge base) can be used for validation.

Example 22—Example Validation Engine

In any of the examples herein, a validation engine can validate a trained chatbot or its internal representation.

In practice, the validation engine can iterate over the input expressions. For each expression, it applies the expression to the trained chatbot and verifies that the chatbot chose the correct intent. Those instances where the chatbot chose the correct intent and those instances where the chatbot chose an incorrect intent (or chose no intent at all) are differentiated. A benchmark can then be calculated as described herein based on the observed chatbot behavior.

Example 23—Example Machine Translation

In any of the examples herein, machine translation can be accomplished by creating an internal representation of an input language passage, applying translation technologies to the internal representation, and outputting a language passage in a different human language.

Example 24—Example Linguistic Expression Generation Templates

The following provides non-limiting examples of linguistic expression generation templates that can be used to generate linguistic expressions for use in the technologies described herein. The examples relate to a "delete" intent, but any number of other intents can be supported.

TABLE 1

Example Templates

[I] (need | request | want) [to] (cancel | delete | discard | remove | undo | reverse) {[a | the] ATTRIBUTE_VALUE | BUSINESS_OBJECT}
[I] (would | 'd) like [to] (cancel | delete | discard | remove | undo | reverse) {[a | the] ATTRIBUTE_VALUE | BUSINESS_OBJECT}
[I] must (cancel | delete | discard | remove | undo | reverse) {[a | the] ATTRIBUTE_VALUE | BUSINESS_OBJECT}
[I] (have | need) a plan to (cancel | delete | discard | remove | undo | reverse) {[a | the] ATTRIBUTE_VALUE | BUSINESS_OBJECT}
[I] (will | 'll) (cancel | delete | discard | remove | undo | reverse) {[a | the] ATTRIBUTE_VALUE | BUSINESS_OBJECT}
[I] (am | 'm) (about | going | planning) to | on (cancel | delete | discard | remove | undo | reverse) {[a | the] ATTRIBUTE_VALUE | BUSINESS_OBJECT}
I'm gonna (cancel | delete | discard | remove | undo | reverse) {[a | the] ATTRIBUTE_VALUE | BUSINESS_OBJECT}
(can | could | may) I [please] (cancel | delete | discard | remove | undo | reverse) {[a | the] ATTRIBUTE_VALUE | BUSINESS_OBJECT}
is it possible to (cancel | delete | discard | remove | undo | reverse) {[a | the] ATTRIBUTE_VALUE | BUSINESS_OBJECT}
is there (a | any) way to (cancel | delete | discard | remove | undo | reverse) {[a | the] ATTRIBUTE_VALUE | BUSINESS_OBJECT}
is there (a | any) way (I | one) (can | could | might) (cancel | delete | discard | remove | undo | reverse) {[a | the] ATTRIBUTE_VALUE | BUSINESS_OBJECT}
and so on Example 25—Example Linguistic Expressions In any of the examples herein, linguistic expressions (or simply "expressions") can take the form of a text string that mimics what a user would or might type, enter, or speak when interacting with a chatbot. In practice, the linguistic expression takes the form of a sentence or sentence fragment (e.g., with subject, verb; subject, verb, object; verb, object; or the like).

The following provides non-limiting examples of linguistic expressions that can be used in the technologies described herein. The examples relate to a "delete" intent (e.g., as generated by the templates of the above example), but any number of other linguistic expressions can be supported.

TABLE 2

Example Linguistic Expressions cancel ATTRIBUTE_VALUE
is it ok to please cancel ATTRIBUTE_VALUE
is it possible cancel ATTRIBUTE_VALUE
is it ok cancel ATTRIBUTE_VALUE
can you cancel ATTRIBUTE_VALUE
could you please cancel ATTRIBUTE_VALUE
is there a way to cancel ATTRIBUTE_VALUE
I need cancel ATTRIBUTE_VALUE
request to cancel ATTRIBUTE_VALUE
I want to cancel ATTRIBUTE_VALUE
i'd like to cancel ATTRIBUTE_VALUE
must cancel ATTRIBUTE_VALUE
I have a plan to cancel ATTRIBUTE_VALUE
need a plan to cancel ATTRIBUTE_VALUE
will cancel ATTRIBUTE_VALUE TABLE 2-continued Example Linguistic Expressions I am about to cancel ATTRIBUTE_VALUE
I am going to cancel ATTRIBUTE_VALUE
I am about on cancel ATTRIBUTE_VALUE
can i please cancel ATTRIBUTE_VALUE
could i please cancel ATTRIBUTE_VALUE
could i cancel ATTRIBUTE_VALUE
can i cancel ATTRIBUTE_VALUE
is there any way i could cancel ATTRIBUTE_VALUE
is there any way i might cancel ATTRIBUTE_VALUE
is there any way one might cancel ATTRIBUTE_VALUE
is there a way one can cancel ATTRIBUTE_VALUE
is there a way i might cancel ATTRIBUTE_VALUE
please is it possible to delete ATTRIBUTE_VALUE
is it possible to please delete ATTRIBUTE_VALUE
is it ok delete ATTRIBUTE_VALUE
is there a way to delete ATTRIBUTE_VALUE
need to delete ATTRIBUTE_VALUE
I want to delete ATTRIBUTE_VALUE
i'd like to delete ATTRIBUTE_VALUE
would like to delete ATTRIBUTE_VALUE
i'd like delete ATTRIBUTE_VALUE
have a plan to delete ATTRIBUTE_VALUE
I am about to delete ATTRIBUTE_VALUE
I am going to delete ATTRIBUTE_VALUE
about to delete ATTRIBUTE_VALUE
going to delete ATTRIBUTE_VALUE
going on delete ATTRIBUTE_VALUE
could i delete ATTRIBUTE_VALUE
can i delete ATTRIBUTE_VALUE
may i please delete ATTRIBUTE_VALUE
and so on Example 26—Example Implementation In one embodiment, one or more non-transitory computer-readable media comprise computer-executable instructions that, when executed, cause a computing system to perform a method. Such a method can comprise the following:

from a plurality of stored linguistic expression generation templates following a syntax supporting optional multiple alternative phrases and grouped by intent, generating a plurality of generated linguistic expressions for developing a chatbot, wherein the generated linguistic expressions have respective pre-categorized intents according to an intent group of a given linguistic expression generation template from which the generated linguistic expressions were generated;

augmenting the generated linguistic expressions via machine translation;

filtering the generated linguistic expressions based on an edit distance;

selecting a first subset of the generated linguistic expressions for use in training;

selecting a second subset of the generated linguistic expressions for use in validation;

training the chatbot with the generated linguistic expressions selected for use in training; and performing a validation on the trained chatbot with the generated linguistic expressions selected for use in validation, wherein the validation generates one or more benchmark values indicative of performance of the chatbot.

Example 27—Example Advantages

A number of advantages can be achieved via the technologies described herein because they can rapidly and easily generate mass amounts of expressions for chatbot development. For example, in any of the examples herein, the technologies can be used to develop chatbots in any number of human languages. Such deployment of a large number of high-quality chatbots can be greatly aided by the technologies described herein.

Such technologies can greatly reduce the development cycle and resources needed to develop a chatbot, leading to more widespread use of helpful, accurate chatbots in various domains.

The challenges of finding good training material in certain languages in certain domains can be formidable. Therefore, the technologies allow quality chatbots to be developed for languages having fewer speakers than other, dominant languages.

Deploying a chatbot to a new use case and calibrating current chatbots can be more easily achieved. Thus, a resulting effect of the development advantages can be greater chatbot user and chatbot developer satisfaction.

Example 28—Example Computing Systems

Figure 10:
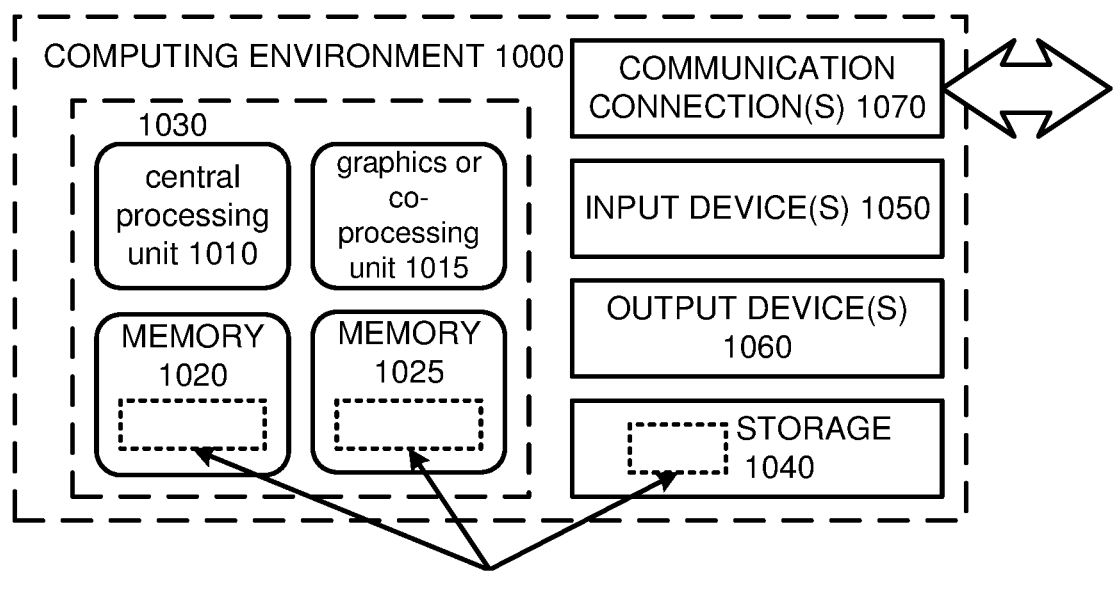
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000.

The storage 1040 stores instructions for the software 1080 implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 29—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 30—Example Cloud Computing Environment

Figure 11:
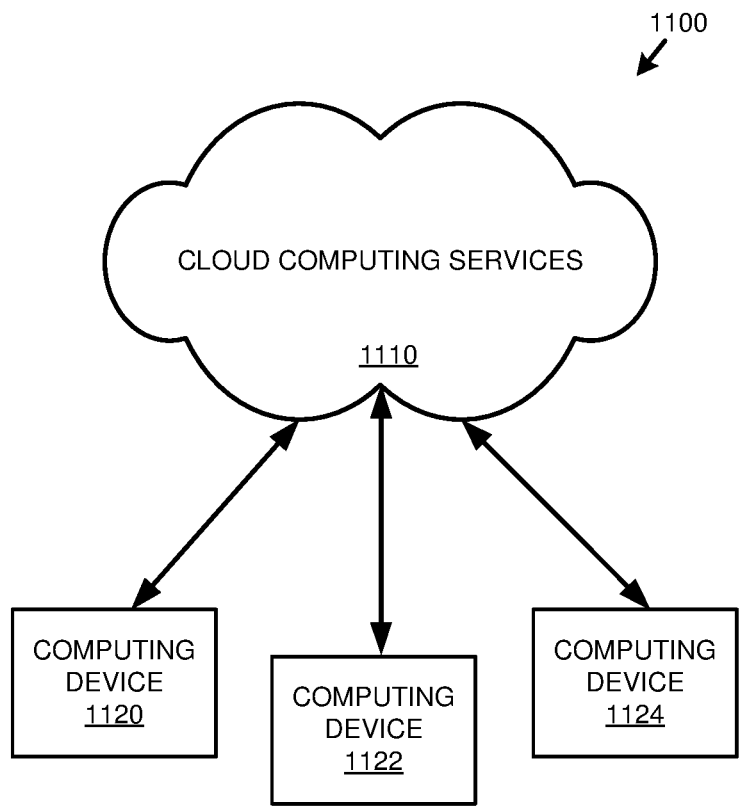
FIG. 11 is a block diagram of an example cloud computing environment that can be used in conjunction with the technologies described herein.

FIG. 11 depicts an example cloud computing environment 1100 in which the described technologies can be implemented, including, e.g., the system 100 of FIG. 1 and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 31—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 32—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method of automated linguistic expression generation comprising:
based on a plurality of stored linguistic expression generation templates following a syntax, generating a plurality of generated linguistic expressions for developing a chatbot, wherein the generated linguistic expressions have respective pre-categorized intents determined from intents associated with the linguistic expression generation templates from which the generated linguistic expressions are generated;
training the chatbot with selected training linguistic expressions of the generated linguistic expressions; and
performing a validation on the trained chatbot with selected validation linguistic expressions of the generated linguistic expressions, wherein the validation generates a benchmark value indicative of performance of the chatbot.

2. The method of claim 1 wherein:
the syntax supports multiple alternative phrases; and at least one of the stored linguistic expression generation templates incorporates at least one instance of multiple alternative phrases.

3. The method of claim 1 wherein:
the syntax supports optional phrases; and
at least one of the stored linguistic expression generation templates incorporates an optional phrase.

4. The method of claim 1 further comprising:
augmenting the generated linguistic expressions before training.

5. The method of claim 4, wherein the augmenting comprises:
performing one or more machine translations on at least one of the generated linguistic expressions.

6. The method of claim 1 further comprising:
before training, filtering the generated linguistic expressions via a linguistic distance score.

7. The method of claim 1 wherein:
the benchmark value comprises one or more selected from the group consisting of:
accuracy,
precision,
recall, and
F1 score.

8. The method of claim 1 further comprising:
selecting a subset of the generated linguistic expressions for training.

9. The method of claim 1 wherein:
the syntax supports regular expressions.

10. The method of claim 1 wherein:
the stored linguistic expression generation templates are associated with respective intents.

11. The method of claim 10 wherein:
the stored linguistic expression generation templates are grouped by intent.

12. The method of claim 1 further comprising:
repeating the training and validation over multiple iterations as the linguistic expression generation templates are modified and the benchmark value converges on an acceptable value.

13. One or more non-transitory computer-readable media comprising computer-executable instructions that, when executed, cause a computing system to perform the method of claim 1.

14. A computing system comprising:
one or more processors;
memory storing a plurality of stored linguistic expression generation templates, wherein the templates are associated with respective intents;
wherein the memory is configured to cause the one or more processors to perform operations comprising:
based on a plurality of stored linguistic expression generation templates following a syntax supporting multiple alternative phrases, generating a plurality of generated linguistic expressions for developing a chatbot, wherein the generated linguistic expressions have respective pre-categorized intents determined from intents associated with the linguistic expression generation templates from which the generated linguistic expressions are generated and generating the plurality of generated linguistic expressions for developing the chatbot comprises choosing from among the multiple alternative phrases; and
training the chatbot with selected training linguistic expressions of the training linguistic expressions and respective of the pre-categorized intents.

15. The computing system of claim 14 wherein the operations further comprise:
validating the chatbot.

16. The computing system of claim 14 wherein:
the syntax supports optional phrases.

17. The computing system of claim 14 wherein the operations further comprise:
filtering the generated linguistic expressions based on an edit distance of the generated linguistic expressions.

18. The computing system of claim 17 wherein the filtering comprises:
removing at least one linguistic expression that has a close edit distance to one or more other linguistic expressions.

19. One or more non-transitory computer-readable media comprising computer-executable instructions that, when executed, cause a computing system to perform a method comprising:
from a plurality of stored linguistic expression generation templates following a syntax supporting optional multiple alternative phrases and grouped by intent, generating a plurality of generated linguistic expressions for developing a chatbot, wherein the generated linguistic expressions have respective pre-categorized intents according to an intent group of a given linguistic expression generation template from which the generated linguistic expressions were generated;
augmenting the generated linguistic expressions via machine translation;
filtering the generated linguistic expressions based on an edit distance;
selecting a first subset of the generated linguistic expressions for use in training;
selecting a second subset of the generated linguistic expressions for use in validation;
training the chatbot with the generated linguistic expressions selected for use in training; and
performing a validation on the trained chatbot with the generated linguistic expressions selected for use in validation, wherein the validation generates one or more benchmark values indicative of performance of the chatbot.

* * * * *